United States Patent
Tsai

(10) Patent No.: US 7,240,772 B2
(45) Date of Patent: Jul. 10, 2007

(54) EMBEDDING TYPED HANDBRAKE OPERATING DEVICE

(75) Inventor: Szu-Fang Tsai, Chang-Hua Hsien (TW)

(73) Assignee: Tektro Technology Corporation, Chang-Hua Hsien (TW)

( * ) Notice: Subject to any disclaimer, the term of this patent is extended or adjusted under 35 U.S.C. 154(b) by 97 days.

(21) Appl. No.: 11/138,333

(22) Filed: May 27, 2005

(65) Prior Publication Data

US 2006/0266594 A1      Nov. 30, 2006

(51) Int. Cl.
*B62L 3/00* (2006.01)
(52) U.S. Cl. .................. 188/24.22; 188/2 D; 74/502.2
(58) Field of Classification Search ............ 188/24.11, 188/24.22, 2 P; 74/502.2, 489, 551.9, 488; D12/179
See application file for complete search history.

(56) References Cited

U.S. PATENT DOCUMENTS

| 4,930,798 | A | * | 6/1990 | Yamazaki et al. | ....... | 188/24.22 |
| 5,050,444 | A | * | 9/1991 | Nishimura | .................. | 74/502.2 |
| 5,285,696 | A | * | 2/1994 | Taylor | ......................... | 74/551.1 |
| 5,678,455 | A | * | 10/1997 | Watarai | ..................... | 74/473.3 |
| 6,941,834 | B2 | * | 9/2005 | Irie | ............................ | 74/551.1 |
| 7,000,936 | B2 | * | 2/2006 | Schmider | ................. | 280/281.1 |

\* cited by examiner

*Primary Examiner*—Bradley King
(74) *Attorney, Agent, or Firm*—Troxell Law Office, PLLC

(57) ABSTRACT

An embedding typed handbrake operating device is disclosed herein, which mainly contains a positioning seat to which an operating lever is pin-joined. A stopping ring, a spring, and a locking seat are sequentially joined to the positioning seat through a locking bolt. The brake sleeve of a brake cable is threaded into the tubular body of the end section of the handlebar via a cable entrance hole and then into the locking seat. A brake wire is threaded through the operating lever, an axial through hole of the locking bolt, and into the brake sleeve connected to the locking seat, and finally to the handbrake assembly.

1 Claim, 5 Drawing Sheets

EMBEDDING TYPED HANDBRAKE OPERATING DEVICE

BACKGROUND OF THE INVENTION (a) Technical Field of the Invention

The present invention generally relates to bicycle handbrake operating device, and more particularly to a handbrake operating device embedded in the tubular body of the bicycle handlebar.

(b) Description of the Prior Art

As illustrated in FIG. 1, a conventional embedding typed handbrake operating device 1 is roughly of a ⊂ shape. The positioning seat 11 of the handbrake operating device 1 is fixedly installed in the tubular body of an end section 21 of a bicycle's handlebar 2 by a locking bolt 12. The handlebar 2 has a cable entrance hole 22 and a cable exit hole 23, allowing a brake cable 3 to pass through and connect to the handbrake operating device 1. When a rider pulls the operating lever 13 of the handbrake operating device 1, the brake wire 31 inside the brake cable 3 activates a handbrake assembly at the other end of the brake wire 31 to brake the bicycle. The conventional embedding type of handbrake operating device 1 has a number of disadvantages.

From a mechanics point of view, an end section 32 of the brake cable 3, in order to pass through the cable exit hole 23, has to suffer two turn. Such turns would introduce more friction to the brake wire 31 and divert a rider's pulling force exerted on the brake wire 31. In other words, the rider has to give a stronger grip in order to brake the bicycle, which is against the efficiency and effectiveness principles of the handbrake operating device.

From a design point of view, the exposure of the end section 32 of the brake cable 3 compromises the outlook of the bicycle. In practice, to conceal the exposed brake cable for avoiding it to get in the way of bicycle operation or for a better outlook, the end section 32 of the brake cable 3 is usually wrapped to the handlebar 2 by plastic or leather tapes, which actually does little help to beautify it.

From an assembly point of view, even though the brake cable 3 is very easy to be inserted into the cable entrance hole 22, getting it out from the cable exit hole 23 is a totally different story, as a user doesn't have direct control over the brake cable 3 inside the handlebar 2. It is therefore very difficult to install a conventional embedding typed of handbrake operating device 1.

Accordingly, there is a need for an embedding typed handbrake operating device of a better design that can obviate the foregoing shortcomings.

SUMMARY OF THE INVENTION

An embedding typed handbrake operating device is disclosed herein, which is installed in an end section of the handlebar. The handbrake operating device mainly contains a positioning seat to which an operating lever is pin-joined. A stopping ring, a spring, and a locking seat are sequentially joined to the positioning seat through a locking bolt. The brake sleeve of a brake cable is threaded into the tubular body of the end section via a cable entrance hole and then inserted into the locking seat. A brake wire is threaded through the operating lever, via an axial through hole of the locking bolt, and into the brake sleeve connected to the locking seat, and finally to the handbrake assembly. As such, the brake wire does not suffer any turn in order get outside of the handlebar just to connect to the operating lever 2. In addition, when the operating lever is pulled, the brake wire, without going through any turn, is able to apply the pulling force to the handbrake assembly directly to brake the bicycle effectively and efficiently.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
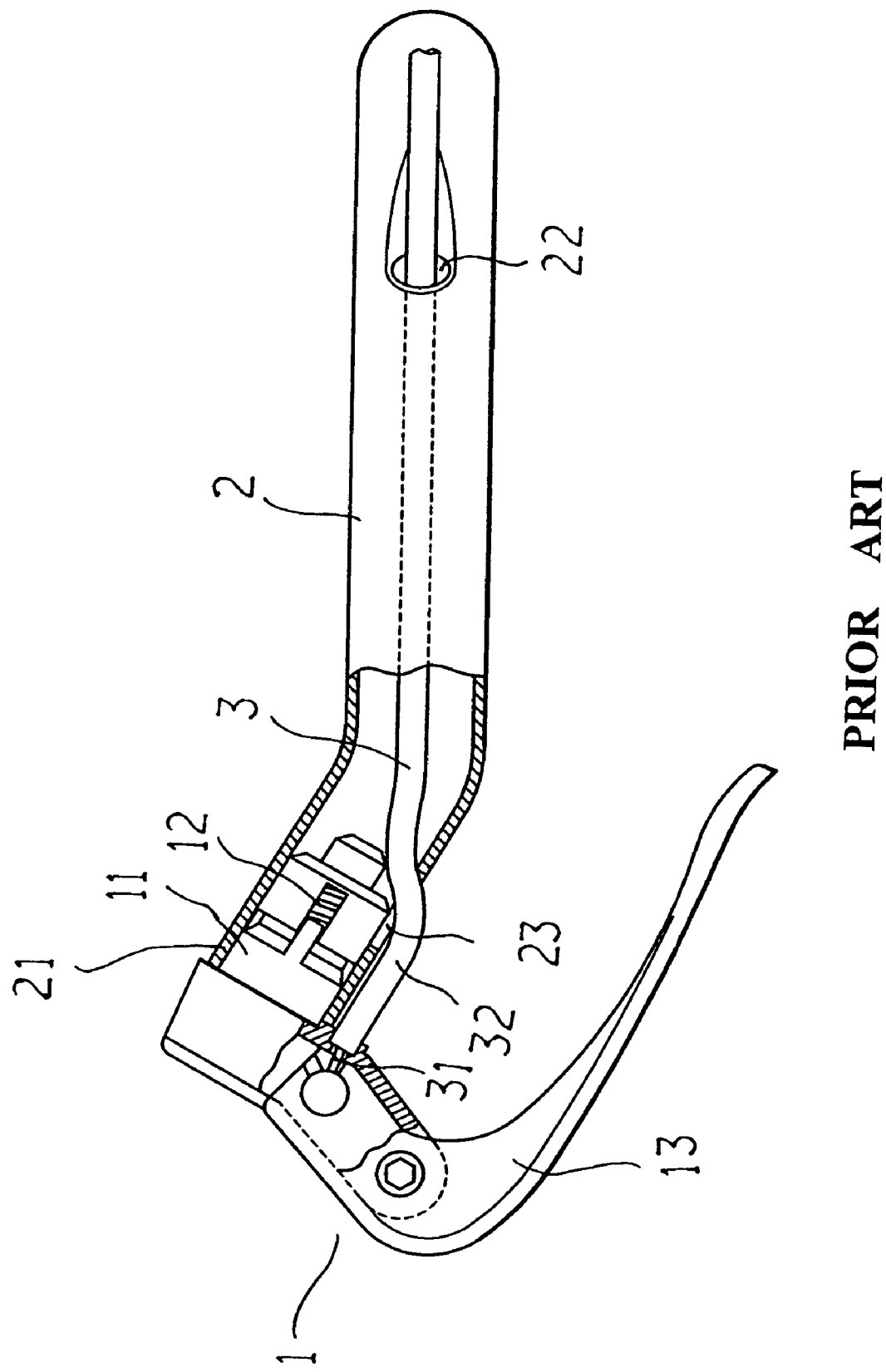
FIG. 1 is a schematic view showing a conventional embedding typed handbrake operating device.
Figure 2:
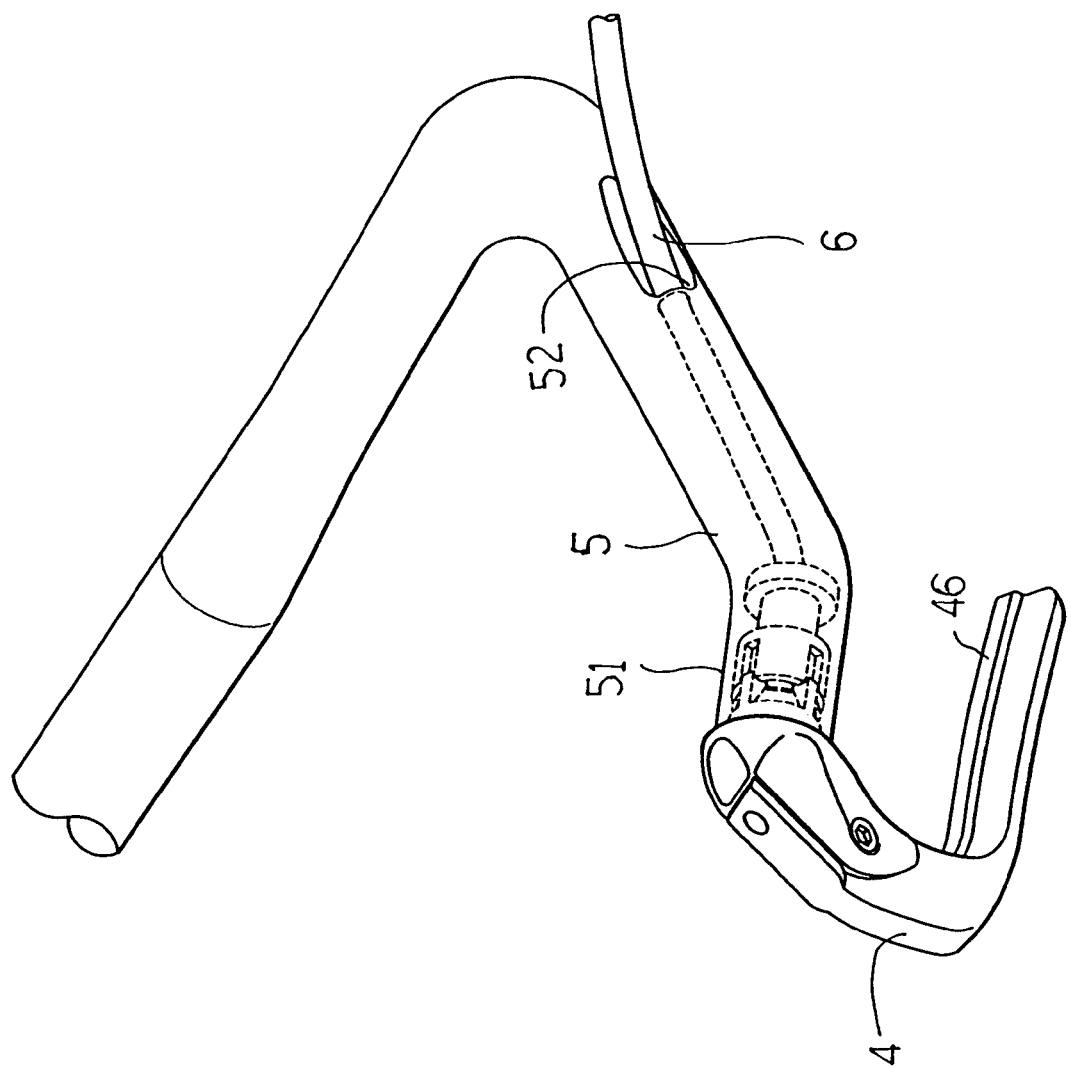
FIG. 2 is a perspective schematic view showing an embedding typed handbrake operating device according to an embodiment of the present invention.
Figure 3:
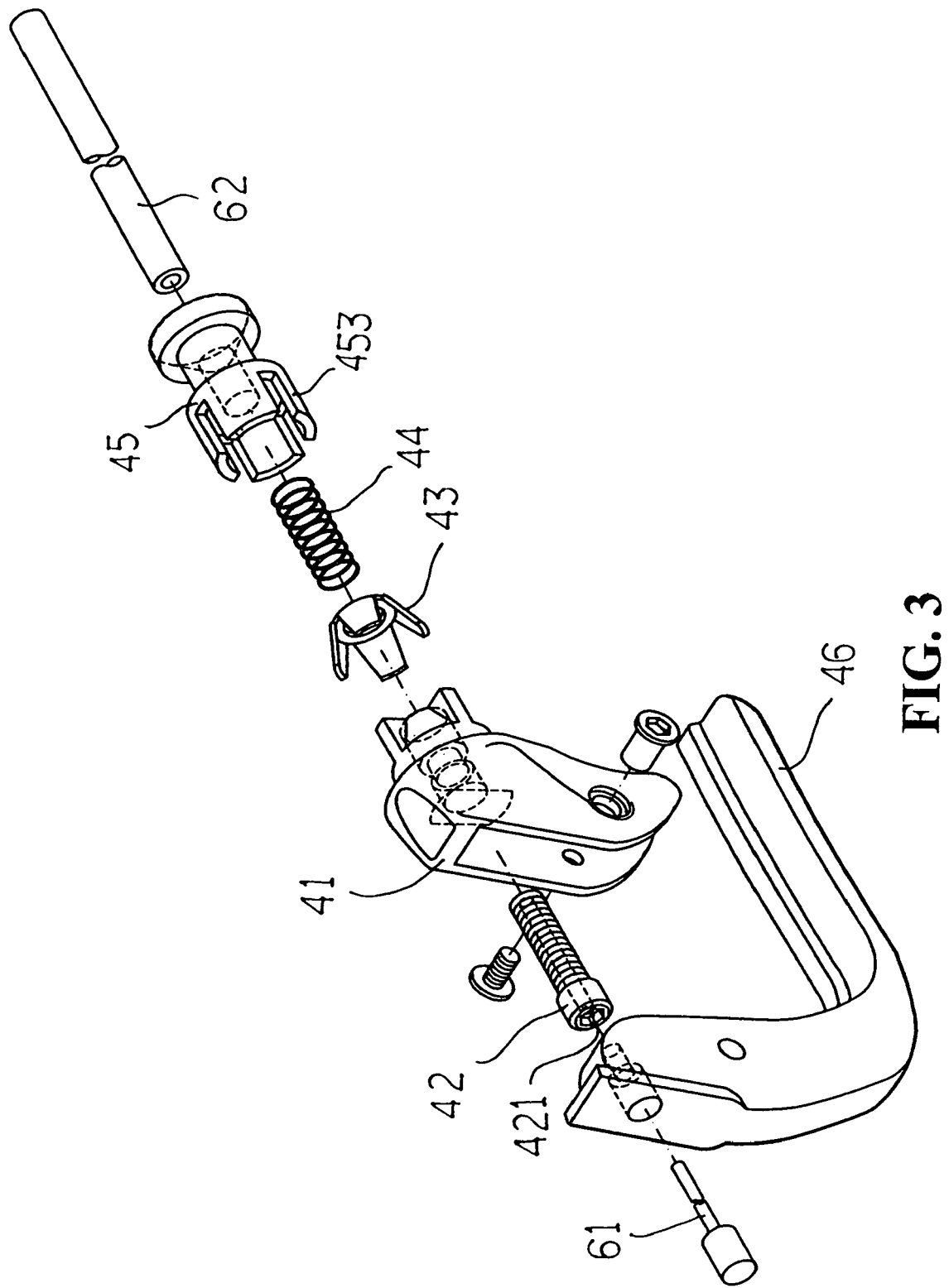
FIG. 3 is a perspective explosion view showing various components of the handbrake operating device of FIG. 2.
Figure 4:
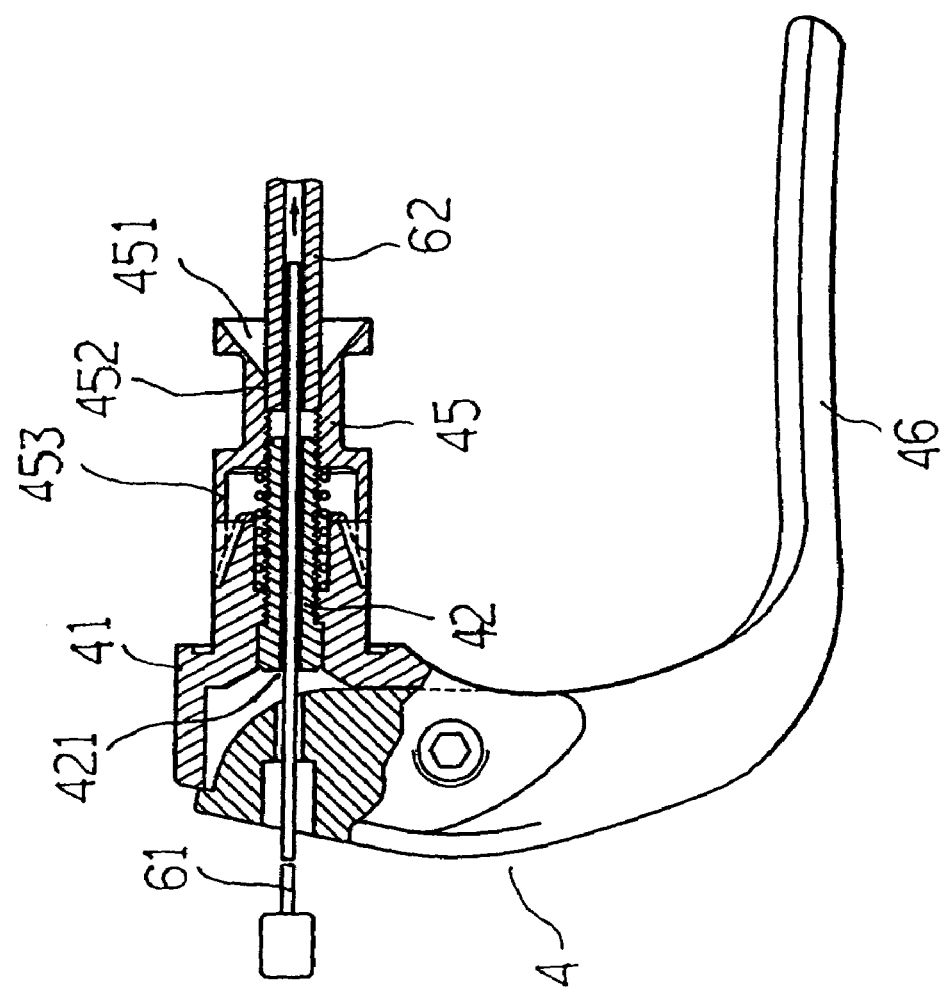
FIG. 4 is an enlarged sectional viewing showing the handbrake operating device of FIG. 2.
Figure 5:
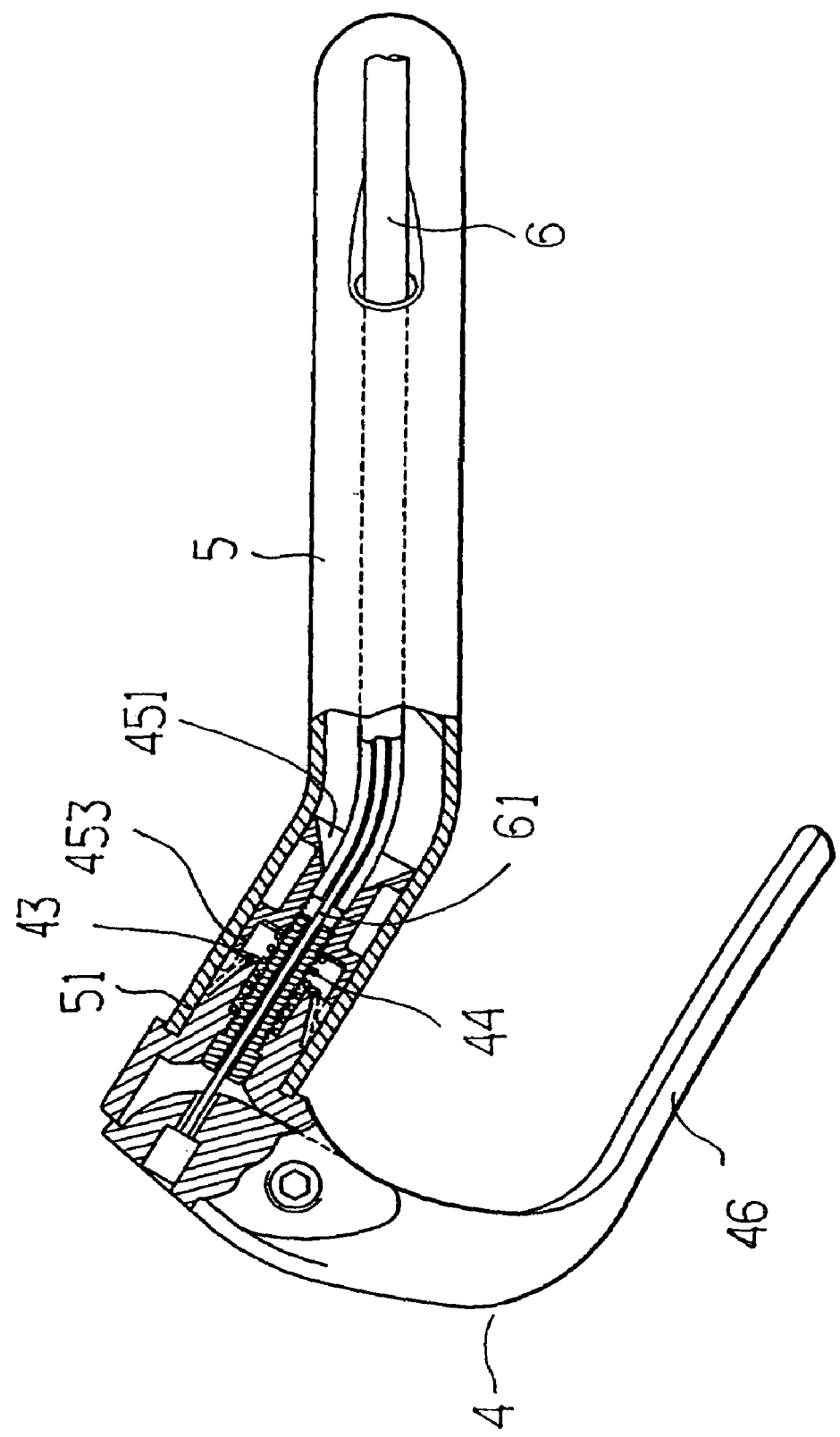
FIG. 5 is another sectional viewing showing the handbrake operating device of FIG. 2.

As illustrated in FIGS. 2~5, a handbrake operating device 4 according to an embodiment of the present invention is fixedly installed in an end section 51 of a bicycle's handlebar 5, or on an end section of an auxiliary handlebar. The handbrake operating device 4 is roughly of a ⊂ shape. The positioning seat 41 of the handbrake operating device 4, via a locking bolt 42, joins a stopping ring 43, a spring 44 and a locking seat 45 sequentially in this order together. To install the handbrake operating device 4 to the handlebar 5, the joined stopping ring 43, spring 44 and locking seat 45 are inserted into the tubular body of the end section 51, leaving the positioning seat 41 at the outside of the end section 51. At an appropriate location on the handlebar 5, there is a cable entrance hole 52 allowing a brake cable 6 to enter the tubular body of the handlebar 5 and reach the handbrake operating device 4.

A brake wire 61 is threaded first through an end of the operating lever 46 of the handbrake operating device 4 adjacent to the locking bolt 42. The brake wire 61 is then threaded through the inside of the positioning seat 41, stopping ring 43, spring 44, and the inside of the locking seat 45, all via an axial through hole 421 of the locking bolt 42.

The brake wire 61 then enters the brake sleeve 62 of the brake cable 6. The locking seat 45 has a cone opening 451 for accepting the brake sleeve 62 entered from the cable entrance hole 52 into an internal stopping tube 452. The brake sleeve 62 would be stuck by the stopping tube 452 and wouldn't be able to go further into the locking seat 45. The stopping tube 452 is aligned with the locking bolt 42 so that the brake wire 61 could be easily slid into the brake sleeve 62 of the brake cable 6 via the axial through hole 421 and reaches the handbrake assembly (not shown) installed on the wheel. As such, a rider of the bicycle is able to activate the handbrake assembly into braking the bicycle when the operating lever 46 is pulled.

When the locking bolt 42 is screwed into the locking seat 45, the locking seat 45 would be drawn toward and press on the stopping ring 43. The blades 453 at the front end (closer to the locking bolt 42) of the locking seat 45 are forced to expand outward so that the handbrake operating device 4 is fixedly locked to the inside of the end section 51 of the handlebar 5. Besides positioning and locking the handbrake operating device 4, as mentioned earlier, the locking bolt 42 has an axial through hole 421 allowing the brake wire 61 to slide freely through the locking bolt 42.

To install the handbrake operating device 4, the brake sleeve 62 of the brake cable 6 is first threaded through the cable entrance hole 52 of the handlebar 5 and extended out from the end section 51 of the handlebar 5. The brake sleeve 62 is then inserted into the stopping tube 452 via the cone opening 451 of the locking seat 45. The locking bolt 42 then threads the positioning seat 41, stopping ring 43, spring 44, and locking seat 45 sequentially in this order together. The foregoing joined assembly is then inserted into the tubular body of the end section 51 of the handlebar 5. The locking bolt 42 is further tightened to lock the joined assembly to the handlebar 5. The brake wire 61 is then threaded through the operating lever 46 and into the axial through hole 421 of the locking bolt 42 and then the brake sleeve 62 joined to the locking seat 45. Finally, to finish the installation, the operating lever 46 is pin-joined to the positioning seat 41, and the brake wire 61 is connected to the handbrake assembly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An embedding handbrake device fixedly installed in an end section of a bicycle's handlebar, said end section of said handlebar having a cable entrance hole allowing a brake sleeve of a brake cable to enter the tubular body of said handlebar, said handbrake operating device comprising an operating lever, a positioning seat, a locking bolt, a stopping ring, a spring, and a locking seat; wherein said locking bolt has an axial through hole, said locking bolt is threaded through said positioning seat, said stopping ring, said spring, and said locking seat sequentially in this order;

said positioning seat, said stopping ring, said spring, and said locking seat joined by said locking bolt are fixedly installed in the tubular body of said end section of said handlebar;

said locking seat has a through tube aligned with said locking bolt for accepting and positioning said brake sleeve of said brake cable, said brake sleeve is inserted from said cable entrance hole into an end of said through tube opposite to said locking bolt;

said operating lever is pin-joined to said positioning seat;

a brake wire of said brake cable is threaded through an end of said operating lever, via said axial through hole of said locking bolt, into said brake sleeve of said brake cable, and connected to a handbrake assembly of said bicycle so that, when a rider pulls said operating lever, said brake wire activates said handbrake assembly to brake said bicycle.

* * * * *